United States Patent [19]
Maxson

[11] Patent Number: 5,302,632
[45] Date of Patent: Apr. 12, 1994

[54] HIGH CONSISTENCY ORGANOSILOXANE COMPOSITIONS COMPRISING FLUORINATED AND NON-FLUORINATED POLYORGANOSILOXANES

[75] Inventor: Myron T. Maxson, Sanford, Mich.

[73] Assignee: Dow Corning Corporation, Midland, Mich.

[21] Appl. No.: 688,766

[22] Filed: Apr. 22, 1991

[51] Int. Cl.$^5$ .................. C08K 9/06; C08L 83/00
[52] U.S. Cl. .................. 523/213; 523/212; 524/588; 524/263; 524/261; 524/265; 524/268; 528/15; 528/42
[58] Field of Search .............. 524/588, 263, 261, 265, 524/268; 523/213, 212; 528/15, 42

[56] References Cited

U.S. PATENT DOCUMENTS

| | | | |
|---|---|---|---|
| 4,032,502 | 6/1977 | Lee et al. | 260/37 SB |
| 4,089,833 | 5/1978 | Simpson | 524/268 |
| 4,317,899 | 3/1982 | Bluestein et al. | 528/42 |
| 4,360,610 | 11/1982 | Murray et al. | 524/588 |
| 4,724,167 | 2/1988 | Evans et al. | 524/588 |
| 4,732,931 | 3/1988 | Maxson | 524/862 |
| 4,857,564 | 8/1989 | Maxson | 523/212 |
| 4,960,811 | 10/1990 | Evans | 524/265 |
| 5,153,238 | 10/1992 | Bilgrien et al. | 524/588 |

FOREIGN PATENT DOCUMENTS 0351797  1/1990  European Pat. Off. .

*Primary Examiner*—Melvyn I. Marquis
*Assistant Examiner*—K. Dean
*Attorney, Agent, or Firm*—Robert Spector

[57] ABSTRACT

The compatibility between high consistency fluorinated and non-fluorinated polydiorganosiloxanes is increased, with a resultant increase in the physical-properties of elastomers prepared from mixtures of these polymers, by blending the polymers together with a reinforcing silica filler that is reacted with both fluorinated and non-fluorinated liquid polydiorganosiloxanes as filler treating agents. The high consistency polydiorganosiloxanes contain at least two alkenyl radicals per molecule and are cured by a hydrosilation reaction.

7 Claims, No Drawings

HIGH CONSISTENCY ORGANOSILOXANE COMPOSITIONS COMPRISING FLUORINATED AND NON-FLUORINATED POLYORGANOSILOXANES

BACKGROUND OF THE INVENTION

1. Field of the Invention

This invention relates to curable organosiloxane compositions. More particularly, this invention relates to high consistency organosiloxane compositions curable by a platinum-catalyzed hydrosilylation reaction. The compositions contain a mixture of fluorinated and non-fluorinated polydiorganosiloxanes. Cured elastomers prepared using the present compositions exhibit unexpectedly high values of desireable physical properties such as tensile and tear strength, resiliency and elasticity.

2. Background Information

Curable compositions containing mixtures of fluorinated and non-fluorinated high consistency polydiorganosiloxanes are known. One of the more common repeating units that constitute at least a portion of the units present in fluorinated polydiorganosiloxanes is the methyl-3,3,3-trifluoropropylsiloxane unit. When compared with cured elastomers prepared from polydimethylsiloxanes, elastomers prepared from fluorinated polydiorganosiloxanes exhibit inferior physical properties such as tensile and tear strength and elasticity in combination with a higher solubility in polar organic liquids such as alcohols, ketones and esters. This reduction in properties is compensated for by a lower solubility and a higher resistance to degradation in the aliphatic hydrocarbons present in aviation and automotive fuels.

Because high consistency fluorinated and non-fluorinated polydiorganosiloxanes are inherently immiscible, elastomers prepared from silica-reinforced mixtures of these polymers may delaminate under stress, thereby substantially reducing the physical properties such as tensile and tear strength of the elastomer relative to the levels achievable using the individual polymers.

One approach to increasing the compatibility of fluorinated and non-fluorinated polydiorganosiloxanes is taught by Evans et al. in U.S. Pat. No. 4,960,811, which issued on Oct. 2, 1990. In accordance with the disclosure of this patent 100 parts of a modified fluorinated polydiorganosiloxane containing both vinyl and silanol groups is blended with from 1 to 10 parts of a polydimethylsiloxane gum containing from 1 to about 10 weight percent of vinyl radicals.

The modified fluorinated polydiorganosiloxanes described in the Evans et al. patent are reaction products of 100 parts of a cyclic fluorinated trisiloxane, and from 0.5 to 2 parts of a chain modifier mixture comprising specified amounts of 1) a vinyl-terminated diorganosiloxane copolymer containing up to 75 repeating units per molecule wherein from 50 to about 67 percent of the repeating diorganosiloxane are not fluorinated and 2) a silanol-terminated diorganosiloxane homopolymer containing from 3 to 6 fluorinated organosiloxane units per molecule.

SUMMARY OF THE INVENTION

The present inventors discovered that the compatibility between high consistency fluorinated and non-fluorinated polydiorganosiloxanes can be increased, with a resultant increase in the physical properties of elastomers prepared from mixtures of these polymers, by blending the polymers together with a reinforcing silica filler that is treated with both fluorinated and non-fluorinated liquid organosilicon compounds. The high consistency polydiorganosiloxanes contain at least two alkenyl radicals per molecule and are cured by a hydrosilylation reaction.

DETAILED DESCRIPTION OF THE INVENTION

This invention provides a high consistency curable organosiloxane composition comprising the product obtained by blending to homogeneity A. a high consistency fluorine-containing polydiorganosiloxane comprising at least two alkenyl radicals per molecule and repeating units of the formula $R^1RfSiO$, where $R^1$ represents an alkyl radical containing from one to four carbon atoms and Rf represents a perfluoroalkylethyl radical containing a total of from 3 to 12 carbon atoms, B. from 5 to 95 weight percent, based on the total weight of all high consistency polydiorganosiloxanes, of a high consistency fluorine-free polydialkylsiloxane containing at least two alkenyl radicals per molecule, where the silicon-bonded alkyl radicals contain from 1 to 4 carbon atoms;

C. an amount of a reinforcing silica filler sufficient to impart the desired level of physical properties to elastomers prepared from said composition, said filler having been treated with D. from 10 to 50 weight percent, based on the weight of said silica, of a silica treating agent comprising a first liquid silanol-containing organosilicon compound or hydrolyzable precursor thereof wherein at least 50 percent of the silicon atoms present in said first compound or precursor contain a fluorinated monovalent hydrocarbon radical represented by Rf', where Rf' is selected from the same group as Rf, and a second liquid silanol-terminated organosilicon compound or hydrolyzable precursor thereof, wherein substantially none of the silicon atoms of said second organosilicon compound or precursor contains a fluorinated hydrocarbon radical;

E. an amount of an organohydrogenpolysiloxane sufficient to achieve curing of said composition in the presence of a hydrosilylation catalyst, where said organohydrogenpolysiloxane is soluble in or miscible with said high consistency polydiorganosiloxane and said high consistency polydialkylsiloxane; and F. an amount of a platinum-containing hydrosilylation catalyst sufficient to promote curing of said composition.

The novel features of the present compositions are 1) the presence of at least one high consistency polydialkylsiloxane that is substantially free of fluorine and at least one high consistency polydiorganosiloxane wherein up to about 50 percent of the silicon-bonded carbon atoms are part of a perfluoroalkylethyl hydrocarbon radical such as 3,3,3-trifluoropropyl, and 2) the presence of at least two silica treating agents. The treating agents are liquid silanol-containing organosilicon compounds or hydrolyzable precursors of these compounds that are converted to the compounds during the silica treatment process. One of these organosilicon compounds is substantially free of fluorine and the other contains fluorinated hydrocarbon radicals bonded to at least a portion of the silicon atoms.

THE HIGH CONSISTENCY POLYDIORGANOSILOXANES (POLYMERS A AND B)

All of the high consistency polydiorganosiloxanes contain at least two silicon-bonded alkenyl radicals per molecule and can be cured by a platinum-catalyzed hydrosilylation reaction. All of the organic radicals bonded to the silicon atoms of polymer A are hydrocarbon or Rf radicals.

As used in the present specification the term "high consistency" refers to polydiorganosiloxanes exhibiting the consistency of a gum at 25° C. The viscosities of these polymers are typically several million poises at 25° C. The polymers are typically characterized in terms of a Plasticity Number that is measured in accordance with ASTM test procedure no. D 926. This number is typically from about 75 to about 400 for fluorinated polydiorganosiloxanes (polymer A) and from 50 to about 350 for polydialkylsiloxanes (polymer B).

The present compositions include at least one high consistency fluorine-containing polydiorganosiloxane, referred to hereinafter as polymer A, and at least one non-fluorinated polydialkylsiloxane, referred to hereinafter as polymer B, that constitutes from 5 to 95 percent of the combined weight of polymers A and B. The weight of polymer B is preferably from 20 to 50 percent of this combined weight.

Both polymer A and polymer B contain at least two alkenyl radicals per molecule. Depending upon the combination of physical properties desired in the cured elastomer prepared using the curable compositions of this invention, up to 3 percent of the non-terminal repeating units of these polymers can contain silicon-bonded alkenyl radicals.

At least a portion of the repeating units in polymer A correspond to the formula $R^1RfSiO$, where $R^1$ represents an alkyl radical containing from 1 to about 4 carbon atoms and Rf represents a perfluoroalkylethyl radical wherein the silicon atom is separated from the perfluoroalkyl radical by 2 non-fluorinated carbon atoms.

The perfluoroalkyl portion of Rf can contain from 1 to about 10 carbon atoms, and includes but is not limited to perfluoromethyl, perfluoroethyl, perfluorobutyl and perfluorooctyl. In preferred embodiments of polymer A Rf is 3,3,3-trifluoropropyl, and $R^1$ is methyl. This preference is based on the availability of convenient methods and reactants for obtaining the starting materials used to prepare this polydiorganosiloxanes.

Polymer B consists essentially of repeating units of the formula $R^2R^3SiO$, where $R^2$ and $R^3$ are individually alkyl and contain from 1 to 4 carbon atoms. Most preferably $R^2$ and $R^3$ are methyl.

Preferred embodiments of the present compositions contain two types of polydiorganosiloxanes as polymer A and/or polymer B. The first type of polydiorganosiloxane contains silicon-bonded alkenyl radicals at only the terminal positions of the polymer molecules while the second type contains these alkenyl radicals at both the terminal positions as well as on non-terminal repeating units.

Methods for preparing polymers A and B are well known. One method comprises polymerizing the corresponding cyclic diorganosiloxane(s) in the presence of a hexaorganodisiloxane or other source of chain terminating unit containing silicon-bonded alkenyl radicals. If alkenyl radicals are present on non-terminal silicon atoms of the final polymer, the required concentration of a cyclic diorganosiloxane such as 1,3,5-trimethyl-1,3,5-trivinylcyclotrisiloxane is included in the polymerization reaction mixture. The polymerization is conducted in the presence of a suitable catalyst such as an alkali metal hydroxide or silanolate.

Polymer A can be represented by the general formula

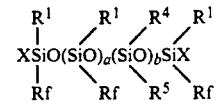

where Rf represents a perfluoroalkylethyl radical as previously defined. $R^1$ and $R^4$ are individually selected from alkyl radicals containing from 1 to 4 carbon atoms, $R^5$ represents an alkenyl radical, X represents a hydroxyl group or $R^5$, the sum of a and b is equivalent to a Williams plasticity Number of from 75 to 400, and the value of b is from 0 to 0.03 a, with the proviso that when X represents a hydroxyl group b is at least 2. Alternatively the terminal group can be $XR^1_2SiO$.

The alkenyl radicals represented by $R^5$ contain from 2 to about 10 carbon atoms, and include but are not limited to vinyl, allyl, butenyl, hexenyl and decenyl. When $R^5$ is other than vinyl or allyl the ethylenically unsaturated carbon atoms are preferably located at the terminal position of the radical.

When the repeating units of polymer B are dimethylsiloxane, the polymer can be represented by the general formula

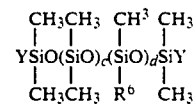

$R^6$ represents an alkenyl radical selected from the same group as $R^5$, Y represents a hydroxyl group or $R^6$, the sum of c and d is equivalent to a Williams Plasticity Number of from 50 to 350, and the value of d is from 0 to 0.03 c, with the proviso that d is at least 2 when Y represents a hydroxyl group.

THE REINFORCING SILICA FILLER (INGREDIENT C)

The curable organosiloxane compositions of this invention contain a finely divided reinforcing silica filler to improve the physical strength of both the composition and cured elastomers prepared from the composition. Reinforcing silica fillers have a surface area of from 50 to greater than 400 m²/g. Reinforcing silica fillers are well known in the art and can be obtained from commercial suppliers. Examples of reinforcing silicas include the fume and precipitated varieties.

The amount of reinforcing filler in the present compositions can vary from 10 to as much as 100 parts by weight per 100 parts by weight of the combined polymers A and B with the usual amount varying between 15 to 50 parts by weight.

THE FLUORINATED AND NON-FLUORINATED SILICA TREATING AGENTS (INGREDIENT D)

Reinforcing silica fillers are typically treated with a low molecular weight organosilicon compound to prevent a phenomenon referred to as "creping" or "crepe hardening". These silica treating agents reduce the interaction between the polydiorganosiloxane and the reinforcing silica that causes the curable composition to undergo an irreversible increase in viscosity during blending and storage of the composition, to the extent that the composition cannot be processed using conventional techniques and equipment.

Suitable silica treating agents are well known in the art, and include but are not limited to liquid silanol-containing organosilicon compounds and organosilicon compounds such as hexaorganodisilazanes that can by hydrolyzed to form these compounds under the conditions used to treat the silica.

Hydrolyzable precursors of silanol-containing silica treating agents include but are not limited to cyclic polydiorganosiloxanes, silazanes and linear polydiorganosiloxanes containing alkoxy or other readily hydrolyzable group.

Preferred filler treating agents include silanol-terminated liquid polydiorganosiloxanes containing from 2 to about 10 repeating units and the corresponding hexaorganodisilazanes.

One of the two characterizing features of the present curable compositions is the presence of a silica that has been treated with both fluorinated and fluorine-free liquid silanol-containing organosilicon compounds or their hydrolyzable equivalents.

The fluorinated hydrocarbon radicals of the fluorine-containing silica treating agents are selected from the same group of perfluoroalkylethyl radicals as Rf. The fluorine-containing silica treating agent is preferably a silanol-terminated polymethyl-3,3,3-trifluoropropylsiloxane and the fluorine-free silica treating agent is preferably a silanol-terminated polydimethylsiloxane.

Either or both types of silica treating agents can contain vinyl or other alkenyl radical represented by $R^5$ in the foregoing formula for polymer A on up to about 50% of the repeating units. The presence of these alkenyl radicals has been shown to improve some physical properties, particularly tear strength, in addition to increasing the durometer hardness of elastomers prepared by curing high consistency polydiorganosiloxanes.

Preferred fluorinated silica treating agents are silanol-terminated polydiorganosiloxanes containing repeating units are represented by the formula $R^7R^fSiO$ and preferred nonfluorinated silica treating agents are silanol-terminated polydiorganosiloxanes containing repeating units represented by the formula $R^8_2SiO$. The hydrocarbon radicals represented by $R^7$ and $R^8$ are individually selected from the same group of alkyl radicals represented by $R^1$ in the preceding formula for polymer A of the present compositions.

The total concentration of silica treating agents is typically from 10 to about 50 weight percent, based on the weight of silica. The relative proportions of the fluorinated and nonfluorinated silica treating agent should preferably approximate the relative concentrations of the fluorinated and nonfluorinated high consistency polydiorganosiloxanes. A preferred composition containing 70 parts by weight of polymer A and 30 parts of polymer B contains equal weights of the two types of silica treating agents.

THE ORGANOHYDROGENPOLYSILOXANE CURING AGENT (INGREDIENT E)

The organosiloxane compositions of this invention are cured by a platinum catalyzed hydrosilation reaction. The curing agent is an organohydrogenpolysiloxane containing an average of more than two silicon bonded hydrogen atoms per molecule. The organohydrogensiloxane contains from as few as four silicon atoms per molecule up to an average of 20 or more, and can have a viscosity of up to 10 Pa.s or higher at 25° C. The silicon-bonded organic groups present on the organohydrogenpolysiloxane consist essentially of substituted and unsubstituted alkyl radicals that are free of ethylenic or acetylenic unsaturation and contain from 1 to 4 carbon atoms. The repeating units of this ingredient include but are not limited to $HSiO_{1.5}$, $R^9HSiO$ and/or $R^9_2HSiO_{0.5}$ in addition to one or more of monoorganosiloxy, diorganosiloxane, triorganosiloxy and $SiO_{4/2}$ units. In these formulae $R^9$ represents a monovalent hydrocarbon radical selected from the same group as $R^1$ or fluorinated hydrocarbon radical selected from the same group as Rf. To ensure adequate curing of preferred curable composition at least a portion of the hydrocarbon radicals of the curing agent are either methyl and/or 3,3,3-trifluoropropyl Alternatively the organohydrogensiloxane can be a cyclic compound containing diorganosiloxane and organohydrogensiloxane units or a compound of the formula $Si(OSiR^9_2H)_4$.

The molar ratio of silicon bonded hydrogen atoms to the total concentration of vinyl or other alkenyl radicals in all of the high consistency polydiorganosiloxanes (polymers A and B) is critical with respect to the properties of the cured elastomer. The optimum ratio for the present curable compositions will be determined at least in part by the concentration of ethylenically unsaturated hydrocarbon radicals in polymers A and B and the type of curing agent. This optimum value can readily be determined by those skilled in the art with a minimum of experimentation, and is not part of this invention.

For preferred compositions of this invention the molar ratio of silicon bonded hydrogen atoms to vinyl and/or other aliphatically unsaturated hydrocarbon radicals is between 1.3 and 2.

THE PLATINUM-CONTAINING HYDROSILYLATION CATALYST AND OPTIONAL INHIBITOR (INGREDIENTS F AND G)

Hydrosilylation reactions are typically conducted in the presence of a catalyst that is a platinum group metal or a compound of such a metal. Platinum compounds such as hexachloroplatinic acid, and particularly complexes of these compounds with relatively low molecular weight vinyl-containing organosiloxane compounds are preferred catalysts because of their high activity and compatibility with the organosiloxane reactants in the present compositions. These complexes are described in U.S. Pat. No. 3,419,593 that issued to David N. Willing on Dec. 31, 1968. Complexes with low molecular weight organosiloxanes wherein the silicon bonded hydrocarbon radicals are vinyl and either methyl or 3,3,3-trifluoropropyl are particularly preferred because of their ability to catalyze a rapid curing of the elastomer at temperatures of at least about 70° C.

The platinum containing catalyst can be present in an amount equivalent to as little as one part by weight of platinum per one million parts of curable composition. Catalyst concentrations equivalent to from 3 to 50 parts of platinum per million of curable composition are preferred to achieve a practical curing rate. Higher concentrations of platinum provide only marginal improvements in curing rate, and are therefore economically unattractive, particularly when the preferred catalysts are used.

Mixtures of the polymers A and B, an organohydrogenpolysiloxane and a hydrosilylation catalyst may begin to cure at ambient temperature. To increase the storage stability of these compositions or obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol and 1-ethynylcyclohexanol constitute a preferred class of inhibitors that will suppress the activity of a platinum-containing catalyst at 25° C. Compositions containing these catalysts typically require heating at temperatures of 70° C. or above to cure at a practical rate.

If it desired to extend the pot life of a curable composition under ambient conditions, this can be accomplished using an ethylenically unsaturated siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

Because compositions containing ingredients A, B, an organohydrogensiloxane and a platinum-containing hydrosilation catalyst may begin to cure under ambient conditions even in the presence of a catalyst inhibitor, it is desirable to package the present compositions in two parts to achieve long term storage stability. Both parts typically contain polymers A and/or B in addition to the reinforcing silica filler that has been treated with the aforementioned silica treating agents. Storage stability is achieved by packaging the organohydrogenpolysiloxane and the hydrosilylation catalyst in separate parts of the composition.

One-part heat curable compositions that will not cure during storage at temperature up to about 40° C. for extended periods of time can be prepared by microencapsulating the platinum-containing hydrosilylation catalyst within a layer of a thermoplastic organic or organosilicon resin in a matrix or coreshell type of structure. Microencapsulated platinum-containing hydrosilylation catalysts together with methods for their preparation are described in U.S. Pat. No. 4,784,879, which issued to C. Lee and R. Willis on Nov 15, 1988. The entire contents of this patent is incorporated by reference thereto.

Curable compositions containing the combination of a microencapsulated platinum-containing hydrosilylation catalyst and selected classes of the aforementioned catalyst inhibitors are described in allowed U.S. patent application Ser. No. 07/372,579.

PREPARATION OF CURABLE COMPOSITIONS

In accordance with a preferred method for preparing the present curable compositions, the reinforcing silica filler is treated in the presence of polymers A and B by blending these polymers together with the silica and both the fluorinated and fluorine-free silica treating agents. Blending of these ingredients can be achieved under relatively high shear using a dough-type mixer. The blending operation is continued until the filler is completely treated and uniformly dispersed throughout the composition to form a homogeneous material. The composition of a typical homogeneous material will not vary significantly when sampled at random locations throughout the material.

The blending operation can require anywhere from 15 minutes to 2 hours, depending upon the amount of material being processed, the viscosity of the material and the shear rate to which the material is subjected during processing.

Alternatively, using silazanes as the silica treating agent, the filler can be treated before the silica is blended with the other ingredients of the present compositions. Methods for treating finely divided silica fillers prior to incorporating the silica into a high consistency organosiloxane composition are known in the art.

Irrespective of the type of mixer used, at least the latter part of the blending operation is conducted while the composition is heated at temperatures from about 100° to 250° C. under reduced pressure to remove volatile materials.

Curable compositions of this invention are prepared by blending the resultant homogeneous mixture of polymers and treated filler with the organohydrogensiloxane and the hydrosilylation catalyst. If a microencapsulated platinum-containing hydrosilylation catalyst is used care should be exercised during incorporation of this ingredient into the composition to avoid rupturing of the microcapsules and premature release of the catalyst.

EXAMPLES

The following examples are intended to describe preferred embodiments of the present curable compositions and should not be interpreted as limiting the scope of the invention as defined in the accompanying claims. Unless otherwise specified all parts and percentages specified in the examples are by weight and viscosities were measured at 25° C.

EXAMPLE 1

This example demonstrates the high levels of physical properties exhibited by elastomers prepared by curing a composition of this invention.

The following ingredients were blended to homogeneity using a dough-type mixer maintained at a temperature of 125°-130° C.

As polymer A, 47.8 parts of a silanol-terminated high consistency polydiorganosiloxane containing about 99.4 mol percent 3,3,3-trifluoropropylmethylsiloxane units, 0.6 mol percent methylvinylsiloxane units and exhibiting a Williams plasticity number of about 279.

As polymer B, 12 parts of a dimethylvinylsiloxy-terminated polydimethylsiloxane gum containing 0.142 mole percent of methylvinylsiloxane units and exhibiting a Williams plasticity number of from 127 (polymer B1) and 12 parts of a dimethylvinylsiloxy-terminated polydimethylsiloxane exhibiting a Williams plasticity number of about 152 (polymer B2);

As ingredient C, 21 parts of a fume silica exhibiting a surface area of about 350 m$^2$/g;

As the fluorine-containing silica treating agent (ingredient D1), 5 parts of a silanol-terminated polymethyl- 3,3,3-trifluoropropylsiloxane exhibiting a viscosity of about 0.1 Pa-s at 25° C. and containing about 6 weight percent of silicon-bonded hydroxyl groups; and As the fluorine-free silica treating agent (ingredient D2), 2.2 parts of a silanol-terminated polydimethylsiloxane exhibiting a viscosity of 0.04 Pa.s.

The resultant mixture was maintained at 150°–175° C. and the contents of the mixture were placed under reduced pressure to remove unreacted silica treating agent and other volatile materials.

A curable composition of this invention was prepared by blending 100 parts of the resultant mixture with as the curing agent (ingredient E), 1.0 or 1.5 part of a trimethylsiloxy-terminated polyorganohydrogensiloxane having an average of five methylhydrogensiloxane units, three dimethylsiloxane units per molecule, and a silicon-bonded hydrogen atom content in the range from about 0.7 to 0.8 weight percent, as the hydrosilylation catalyst (ingredient F), 0.15 part of a reaction product of hexachloroplatinic acid and symtetramethyldivinyldisiloxane that has been diluted with a liquid dimethylvinylsiloxy terminated polydimethylsiloxane in an amount sufficient to achieve a platinum content of 0.7 weight percent 0.02 parts of methylbutynol as a platinum catalyst inhibitor, and 1.0 part of the product obtained by blending to homogeneity 100 parts by weight of a hydroxyl-terminated polydimethylsiloxane gum exhibiting a Williams plasticity number of about 145 and 100 parts of hydrated cerric oxide.

The final compositions were cured in sheet form by heating them for 10 minutes at 171° C. in a hydraulic press under a gauge pressure of 20 tons. Various physical properties of the resultant cured elastomer samples were measured using the appropriate ASTM (American Society of the Testing of Materials) test methods, and the results are recorded in Table 1.

The elastomer was post-cured for four hours at 200° C. in circulating air oven. The same physical properties were again measured and the results are recorded in Table 1.

For purposes of comparison, a curable composition was prepared as described in the preceding section of this example, with the exception that the organohydrogenpolysiloxane, curing catalyst and catalyst inhibitor were replaced by 1.0 part of a 1:1 weight ratio mixture of 2,5-dimethyl-2,5-di(t-butylperoxy)hexane and an inert solid filler. This sample was cured and post-cured under the same conditions described for the compositions cured by a hydrosilylation reaction. The physical properties of the resultant cured elastomers are recorded in Table 1.

TABLE 1

| Curing Agent Ingredient/Parts | Durometer (Shore A) | Tensile Strength (psi/Mpa) | Tear Strength Strength ppi//kN/m. | Resiliency (Bayshore) | Elongation (%) |
|---|---|---|---|---|---|
| E/1.0 | 49 | 1170/8.1 | 210//36.7 | 35 | 607 |
| E/1.5 | 51 | 1125/7.8 | 177//31.0 | 30 | 535 |
| Peroxide/1.0 | 47 | 1006/7.0 | 124//21.7 | 24 | 575 |

EXAMPLE 2

This example demonstrates the use of a curable composition of this invention wherein the curing agent and hydrosilylation catalyst contain fluorinated hydrocarbon radicals bonded to silicon and the effect of varying the concentration of curing agent in the composition.

A curable composition was prepared using the same procedure and quantities of polymers A and B and silica treating agents specified in Example 1. The curing agent was two parts of a linear dimethylhydrogensiloxy-terminated polyorganohydrogensiloxane containing an average of three repeating units per molecule of the formula

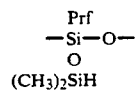

where Prf represents a 3,3,3-trifluoropropyl radical, and 0.2 part of a reaction product of hexachloroplatinic acid and a liquid vinyl-containing poly(methyl-3,3,3-trifluoropropyl)siloxane. The reaction product contains 0.67 weight percent platinum. 0.04 part of methylbutynol was used as the catalyst inhibitor.

The compositions was cured and evaluated as described in Example I and the results are recorded in Table 2.

TABLE 2

| Parts Curing Agent | Durometer (Shore A) | Tensile Strength (psi/Mpa) | Tear Strength (Die B) ppi//kN/m | Resiliency (Bayshore) | Elongation (%) |
|---|---|---|---|---|---|
| 0.75 | 42 | 1108/7.6 | 202//35.4 | 27 | 650 |
| 1.0 | 42 | 1219/8.4 | 190//33.2 | 30 | 605 |
| 1.5 | 47 | 1105/7.6 | 188//32.9 | 31 | 578 |
| 2.0 | 50 | 1034/7.1 | 155//27.1 | 32 | 505 |

EXAMPLE 3

This example compares the properties of a composition of this invention with one prepared using only a polydimethylsiloxane or a fluorinated polydiorganosiloxane as the silica treating agent.

Curable compositions were prepared using the same types and amounts of polymers A and B described in example 1, together with, as the curing agent, one part of a trimethylsiloxy-terminated polydiorganosiloxane having an average of five methylhydrogensiloxane units and three dimethylsiloxane units per molecule with a silicon-bonded hydrogen atom content in the range from about 0.7 to 0.8 weight percent, and, as the catalyst, 0.15 part of a reaction product of hexachloroplatinic acid and symtetramethyldivinyldisiloxane that has been diluted with a liquid dimethylvinylsiloxy-terminated polydimethylsiloxane in an amount sufficient to achieve a platinum content of 0.7 weight percent. 0.04 part of 1-ethynylcyclohexanol was used as the platinum catalyst inhibitor.

The composition of this invention (I) was prepared using 3.6 parts of a hydroxyl terminated methyl-3,3,3-trifluoropropyl polysiloxane having a viscosity of about 0.1 Pa.s at 25° C. and containing about 6 weight percent of silicon-bonded hydroxyl groups (ingredient DI) and 3.6 parts of a hydroxyl terminated polydimethylsiloxane fluid having a viscosity of about 0.04 Pa-s at 25° C. and about 4 weight percent silicon-bonded hydroxyl radicals (Ingredient D2). One of the two comparative compositions (IIc) contained 7.2 parts of the fluorinated silica treating agent (ingredient D1) and the second (IIIc) contained 7.2 parts of the non-fluorinated silica treating agent (ingredient D2).

The compositions were cured and evaluated as described in Example 1 and the results are recorded in Table 3.

TABLE 3

| Composition | Durometer (Shore A) | Tensile Strength (psi/Mpa) | Tear Strength (Die B) ppi//kN/m | Resiliency (Bayshore) |
|---|---|---|---|---|
| I | 57 | 1194/8.2 | 215//37.6 | 35 |
| IIc* | 42 | 918/6.3 | 147//25.7 | 26 |
| IIIc* | 51 | 930/6.4 | 80//14 | 41 |

* = comparative samples

EXAMPLE 4

This example describes compositions of this invention containing a microencapsulated hydrosilylation catalyst. The catalyst was prepared by microencapsulating a platinum-containing catalyst in a matrix of an organosilicone resin containing 90 mole percent of phenylsilsesquioxane units and 10 mole percent of dimethylsiloxane units.

The platinum catalyst was a reaction product of hexachloroplatinic acid and sym-tetramethyldivinyldisiloxane that contains unreacted disiloxane together with small amounts of isopropanol and water. The platinum content is 5.3%.

In accordance with known techniques the resin was precipitated from solution in the presence of the catalyst followed by spray drying of the resultant finely particles. The microcapsules contained about 92 weight percent of resin and 0.4 weight percent of platinum.

A catalyst composition (ingredient F') was prepared by blending ten parts of the particles of microencapsulated catalyst to homogeneity with 90 parts of a mixture that had been prepared by blending to homogeneity the following ingredients: 65.8 parts of a dimethylvinylsiloxy terminated polydimethylsiloxane having a viscosity of about 2.1 Pa-s at 25° C., 26.3 parts of a fume silica having a nominal surface area of 250 m² per gram. 1.90 parts of water and 6 parts of hexamethyldisilazane.

A curable composition of this invention (IV) was prepared using the same types and amounts of high-consistency polyorganosiloxanes, filler and silica treating agents described in example 1. The composition also contained 1.0 part of the curing agent (ingredient D) of example 1, 1 part of the microencapsulated catalyst-/polyorganosiloxane/silica mixture (E'), 0.4 part of 1-ethynylcyclohexanol and 1.0 part of the product obtained by blending to homogeneity 100 parts by weight of a hydroxyl-terminated polydimethylsiloxane gum exhibiting a Williams plasticity number of about 179 and 100 parts of hydrated cerric oxide.

The composition was cured and evaluated as described in Example 1 and the results are recorded in Table 4. For comparative purposes a curable composition (IVc) was prepared and cured using the same types and amounts of high consistency polydiorganosiloxanes, silica, silica treating agents, and heat stability additive as the composition described in the first portion of this example. The curing agent and curing catalyst was replaced with 1.0 part of 1:1 weight ratio mixture of 2,5-bis(tert-butylperoxy)-2,5-dimethylhexane and an inert solid diluent.

TABLE 4

| Sample | Durometer (Shore A) | Tensile Strength (psi/Mpa) | Tear Strength (Die B) ppi//kN/m | Resiliency (Bayshore) |
|---|---|---|---|---|
| IV | 47 | 1040/7.2 | 190//33.2 | 29 |
| IVc* | 50 | 1050/7.2 | 115//20.1 | 25 |

* = Comparative composition cured using an organic peroxide

The data in Table 4 demonstrate the substantially higher tear strength exhibited by elastomers prepared using a curable composition of this invention relative to one cured using an organic peroxide.

That which is claimed is:

1. A curable organosiloxane composition comprising a homogeneous blend of
   A. 100 parts by weight of at least one high consistency fluorine-containing polydiorganosiloxane comprising at least two alkenyl radicals per molecule and repeating units of the formula $R^1RfSiO$, where $R^1$ represents an alkyl radical containing from one to four carbon atoms and Rf represents a perfluoroalkylethyl radical containing a total of from 3 to 12 carbon atoms,
   B. from 5 to 95 weight percent, based on the combined weight of all high consistency polydiorganosiloxanes, of at least one high consistency fluorine-free polydialkylsiloxane containing at least two alkenyl radicals per molecule, where the repeating units of said fluorine-free polydialkylsiloxane correspond to the formula $R^2R^3SiO$, $R^2$ and $R^3$ represent identical or different alkyl radicals containing from 1 to 4 carbon atoms, and where said fluorine-containing polydiorganosiloxane and said fluorine-free polydialkylsiloxane constitute all of the high consistency polydiorganosiloxanes present in said composition and exhibit the consistency of a gum at 25° C.;
   C. from 10 to 100 weight percent, based on the combined weight of all high consistency polydiorganosiloxanes, of a reinforcing silica filler, said filler having been treated with
   D. from 10 to 50 weight percent, based on the weight of said filler, of a mixture comprising a first liquid silanol-terminated terminated organosilicon compound or hydrolyzable precursor thereof wherein at least 50 percent of the silicon atoms present in said first silanol-terminated organosilicon compound or precursor contain a monovalent fluorinated hydrocarbon radical Rf', where Rf' is selected from the same group as Rf, and a second liquid silanol-terminated organosilicon compound or hydrolyzable precursor thereof, wherein substantially none of the silicon atoms of said second silanol-terminated organosilicon compound or precursor contain a fluorinated hydrocarbon radical;

E. an amount of an organohydrogenpolysiloxane sufficient to achieve curing of said composition in the presence of a hydrosilation catalyst, where said organohydrogenpolysiloxane is soluble in or miscible with said high consistency polydiorganosiloxanes and said high consistency polydialkylsiloxane; and F. an amount of a platinum-containing hydrosilation catalyst sufficient to promote curing of said composition.

2. A composition according to claim 1 where said composition contains from 10 to 100 parts by weight of said silica filler, said first liquid organosilicon compound is a silanol-terminated polydiorganosiloxane containing repeating units represented by the formula $R^7Rf'SiO$;

said second liquid organosilicon compound is a silanol-terminated polydiorganosiloxane containing repeating units represented by the formula $R^8_2SiO$, where $R^7$ and $R^8$ are individually selected from the same group of alkyl radicals represented by $R^1$;

the silicon-bonded organic groups present on said organohydrogenpolysiloxane consist essentially of substituted and unsubstituted alkyl radicals that are free of ethylenic or acetylenic unsaturation and contain from 1 to 4 carbon atoms, the total concentration of silica treating agents is from 10 to 50 weight percent, based on the weight of said silica filer, and the concentration of said hydrosilylation catalyst is equivalent to from 3 to 50 parts by weight of platinum per million parts of said composition.

3. A composition according to claim 2 where said high consistency fluorine-containing polydiorganosiloxane is represented by the general formula

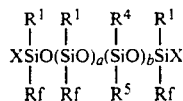

where Rf represents said perfluoroalkylethyl radical, $R^1$ and $R^4$ are individually selected from alkyl radicals containing from 1 to 4 carbon atoms, $R^5$ represents an alkenyl radical containing from 2 to 10 carbon atoms, X represents a hydroxyl group or $R^5$, the sum of a and b is equivalent to a Williams plasticity number of from 75 to 400, and the value of b is from 0 to 0.03 a, with the proviso that b is at least 2 when X represents a hydroxyl group;

said fluorine-free high consistency polydialkylsiloxane is represented by the general formula

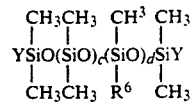

where $R^6$ represents an alkenyl radical containing from 2 to 10 carbon atoms, Y represents a hydroxyl group or $R^6$, the sum of c and d is equivalent to a Williams plasticity number of from 50 to 350, and the value of d is from 0 to 0.03 c, with the proviso that d is at least 2 when Y represents a hydroxyl group;

the concentration of said reinforcing filler is from 15 to 50 parts by weight, based on the combined weight of said high consistency fluorine-containing polydiorganosiloxane and high consistency fluorine-free polydialkylsiloxane, said first liquid silanol-terminated organosilicon compound is a silanol-containing polymethyl-3,3,3-trifluoropropylsiloxane, said second liquid silanol-terminated organosilicon compound is a silanol-terminated polydimethylsiloxane, the molar ratio of silicon-bonded hydrogen atoms present in said organohydrogenpolysiloxane to alkenyl radicals present in the combination of said fluorinated high consistency polydiorganosiloxane and said fluorine-free high consistency polydialkylsiloxanes is from 1.3 to 2, inclusive, said hydrosilation catalyst is a complex of hexachloroplatinic acid and a liquid vinyl-containing organosilicon compound, and said composition contains a hydrosilation catalyst inhibitor.

4. A composition according to claim 3 where
$R^1$, $R^2$, $R^7$ and $R^8$ are methyl;
Rf and Rf' are 3,3,3-trifluoropropyl;
$R^5$ and $R^6$ are vinyl or 5-hexenyl;
said inhibitor is selected from the group consisting of acetylenic alcohols and ethylenically unsaturated siloxanes and is present at a concentration of from 1 to 500 moles per mole of platinum metal.

5. A composition according to claim 4 where said hydrosilylation catalyst is microencapsulated within at least one layer of an organic or organosilicon resin.

6. A composition according to claim 1 where said hydrosilylation catalyst is microencapsulated within a layer of an organic or organosilicon resin.

7. A composition according to claim 1 where said composition is packaged in at least two parts with said organohydrogen-polysiloxane and said hydrosilylation catalyst located in different parts of said composition.

* * * * *